UNITED STATES PATENT OFFICE.

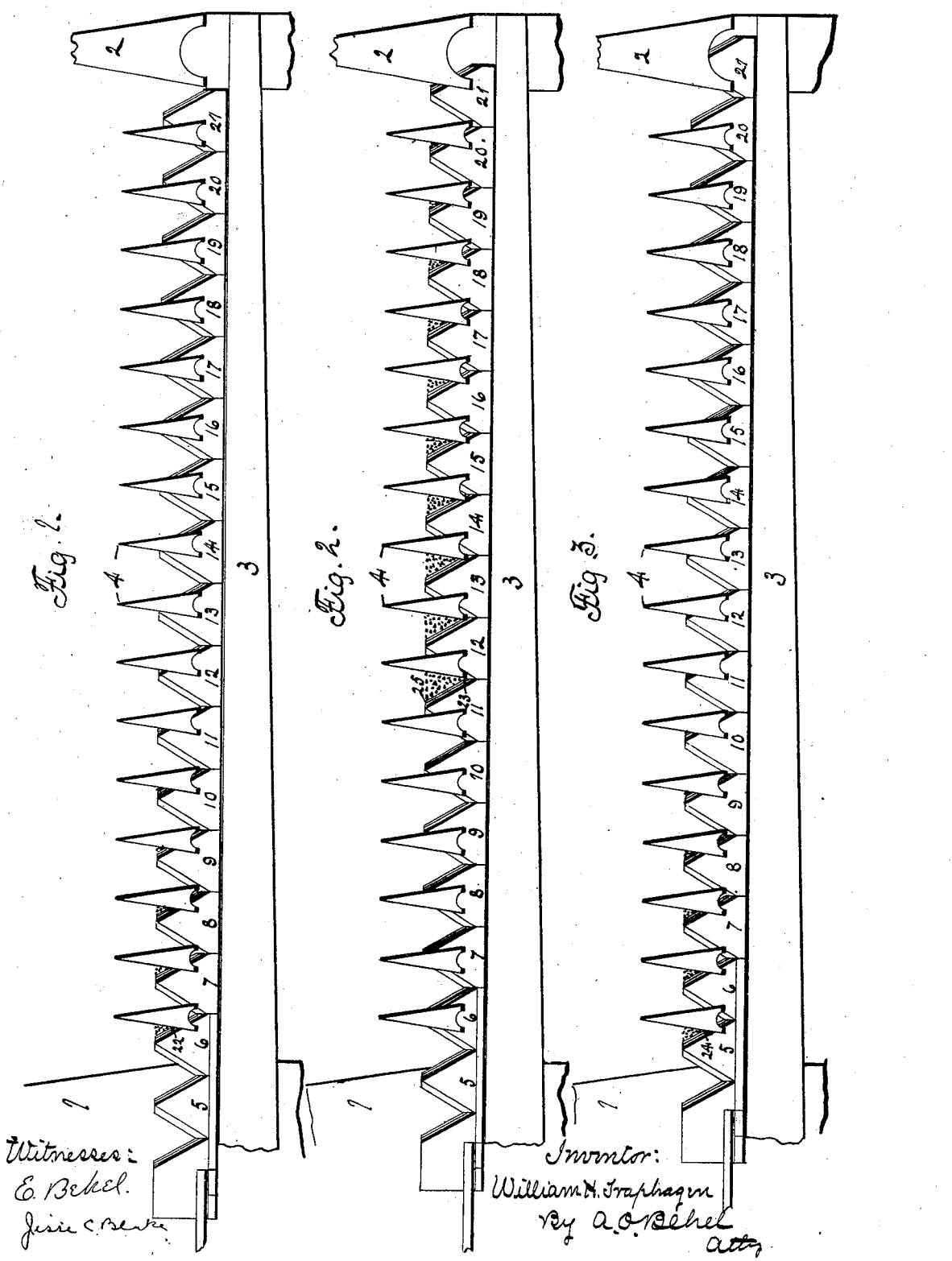

WILLIAM H. TRAPHAGEN, OF ROCKFORD, ILLINOIS, ASSIGNOR TO THE EMERSON MANUFACTURING COMPANY, OF SAME PLACE.

HARVESTING-MACHINE.

SPECIFICATION forming part of Letters Patent No. 660,281, dated October 23, 1900.

Application filed June 23, 1898. Serial No. 684,259. (No model.)

*To all whom it may concern:*

Be it known that I, WILLIAM H. TRAPHAGEN, a citizen of the United States, residing at Rockford, in the county of Winnebago and State of Illinois, have invented certain new and useful Improvements in Cutting Apparatuses for Harvesting - Machines, including Reaping and Mowing Machines, of which the following is a specification.

The object of this invention is to construct a cutting apparatus for harvesting and mowing machines in which the guards and knife-sections are so spaced and arranged that but few sections are cutting at the beginning and end of the stroke of the knife and a greater number cutting at the center of the stroke.

In the accompanying drawings, Figure 1 is a plan view of my improved cutting apparatus in which the knife is just commencing its outward stroke or throw, the grass or grain about to be severed being represented by dots contiguous to sections 6, 7, 8, 9, and 10. Fig. 2 is a similar view in which the knife is at the center of its throw or stroke, the grass or grain about to be severed being represented by dots contiguous to sections 11, 12, 13, 14, 15, 16, 17, 18, 19, 20, and 21. Fig. 3 is a view of the cutting apparatus in which the knife is just approaching the outer end of its stroke or throw, the grass or grain about to be severed being represented by dots contiguous to sections 5, 6, 7, 8, and 9.

My improved cutting apparatus consists of the inner shoe 1, outer shoe 2, finger-bar 3, supporting-guards 4, and a knife composed of the sections 5 to 21, inclusive. This cutting apparatus is designed especially for harvesting-machines when the stalks are quite stiff—as, for example, rye and timothy-grass. The knife is located to move through the guards. The distance from center to center of the sections is different from the distance between the centers of the guards, and the throw of the knife is preferably equal to the distance from center to center of guards.

In certain conditions or kinds of grass or grain, especially when it is very uniform and stiff, it is desirable that the distance from center to center of the knife-sections, as compared with the distance from center to center of the guards, should be so regulated and arranged that a few sections should be cutting at each end of the stroke of the knife when its motion is very low and a larger number during the middle of its throw, when its motion is very high, and the grass being brittle a larger portion of the grass is severed in the same way that a hatchet cuts a stick rather than the shearing motion of cutting through limber fibers or stalks. The faster the motion of the harvester the easier it cuts the stalks.

Most of the cutting of the knife in most crops is like that of a pair of shears, and no cutting of any consequence in almost every kind and condition of grass or grain is done until the edge of the section begins to cross the edge of the guard. In the cutting apparatus now in use, where the distance from center to center of the sections is the same as the distance from center to center of guards, but little cutting is done until the cutting edges of the sections begin to cross the cutting edges of the guards, and if the motion of the knife is very high, so that the machine does not advance in proportion to the surface cut by the knife, most of the cutting is done by the forward half of two-thirds of the sections. It is obvious that most of the labor of the knife is done during about one-third of its throw, for only during that period is the cutting edge of the section crossing the cutting edge of the guard. The result is a heavy chuck toward the end of each stroke and consequent wear on portions of the pitman and wrist-pin and greater danger of the machine being choked by having all of the labor of cutting thrown on the machine at some particular portion of the stroke of the knife, and the same rule would apply if the distance from guard to guard were an even fraction of the distance from center to center of the sections, or vice versa.

In Fig. 1, where the knife is just beginning its outward throw to the right, the outward throw being preferably equal to the distance between the guards, section 6 will begin its shear-cutting at 22, and the sections 7, 8, 9, and 10 are also cutting, the cutting-point being higher on each section while the remaining sections are not cutting, and when the knife has made half of its throw outward, as shown at Fig. 2, it will be seen that section 11 will begin its cutting at the point 23 and sections 12, 13, 14, 15, 16, 17, 18, 19, 20, and 21 are cutting at some point of their length, while the remaining sections are not cutting, and when near the end of the outward stroke to the right, as shown at Fig. 3, section 5 will begin its shear-cutting at 24, while the sections 6, 7, 8, 9, and 10 are cutting at some point of their length and the remaining sections are not cutting. Thus it will be seen that but few sections are cutting at the beginning and end of the outward stroke, and a greater number are cutting at the center of the outward stroke, and each section is cutting at some part of the outward stroke the full length of its cutting edge, providing the advance of the machine during each stroke of the knife is equal to the distance from 23 to 25, Fig. 2. In practice it is found that a higher speed works better. Consequently the cutting would, if the higher speed were used and the guards and sections spaced with relation to each other as supposed above, be done in advance of the point at which it would be done if the finger-bar were maintained in a fixed position or relation to the truck of the wheels; but this is not desirable, and by having the finger-bar hinged to the coupling-bar and the coupling-bar hinged to the machine either above or below the plane of the center of the crank-shaft the finger-bar is changed by the inequality of the ground: The relative position of each knife-section to the guard at the commencement of the stroke is different from what it would be if the fingers were at the lower level. In other words, while the change is being made the relative distance the machine advances to the length of the stroke is changed and also the cutting portion of each section is changed. In this way it is found that as the finger-bar is constantly raising and lowering it receives a constant change as to where the principal amount of cutting is done on each section.

By my arrangement the slightest movement of the knife will begin cutting, and the amount of cutting will continue about even throughout the whole of the stroke, while in the old construction about one-half of its movement before any of the sections are in a condition to commence cutting. Then all commence cutting together with a chuck or jerk. The consequence is to strain the machine, and all of the wear comes on one side of the wrist-pin of the crank, which is the reason that one side of the wrist-pin is worn away, while the other side remains unworn. This chuck of the knife is what frequently causes the machine to clog up and stop with a jerk, which often breaks some part, while in my construction it is obvious from the drawings that the sections work in series. Consequently there is no chuck, and the liability of choking down, stopping, or breaking the machine is much diminished.

It is obvious that while the combinations of guards and sections herein set forth is the best for some crop conditions they can still be used fairly well for most or all other crop conditions.

I am aware that in a patent granted to Clough, March 29, 1887, No. 360,374, is shown a cutting apparatus in which the same number of sections are cutting at all times, but not all the sections cutting at any one time.

I claim as my invention—

In a cutting apparatus, a series of equidistant guards and a coöperating series of cutting-sections equidistantly attached to a bar reciprocating through a distance approximately equal to the distance between the guards, the distance between the centers of the sections being slightly different from the distance between the centers of the guards, whereby the sections will come into action in succession instead of simultaneously; said bar being so adjusted longitudinally that at the beginning of the outward stroke only a few sections at one end of the bar shall be in action; and the number of sections being such that near the end of said stroke only a few of the sections at the other end of the bar shall be in action, while in intermediate parts of the stroke the intermediate sections shall be in action.

WILLIAM H. TRAPHAGEN.

Witnesses:
A. O. BEHEL,
E. BEHEL.